United States Patent Office 3,544,385
Patented Dec. 1, 1970

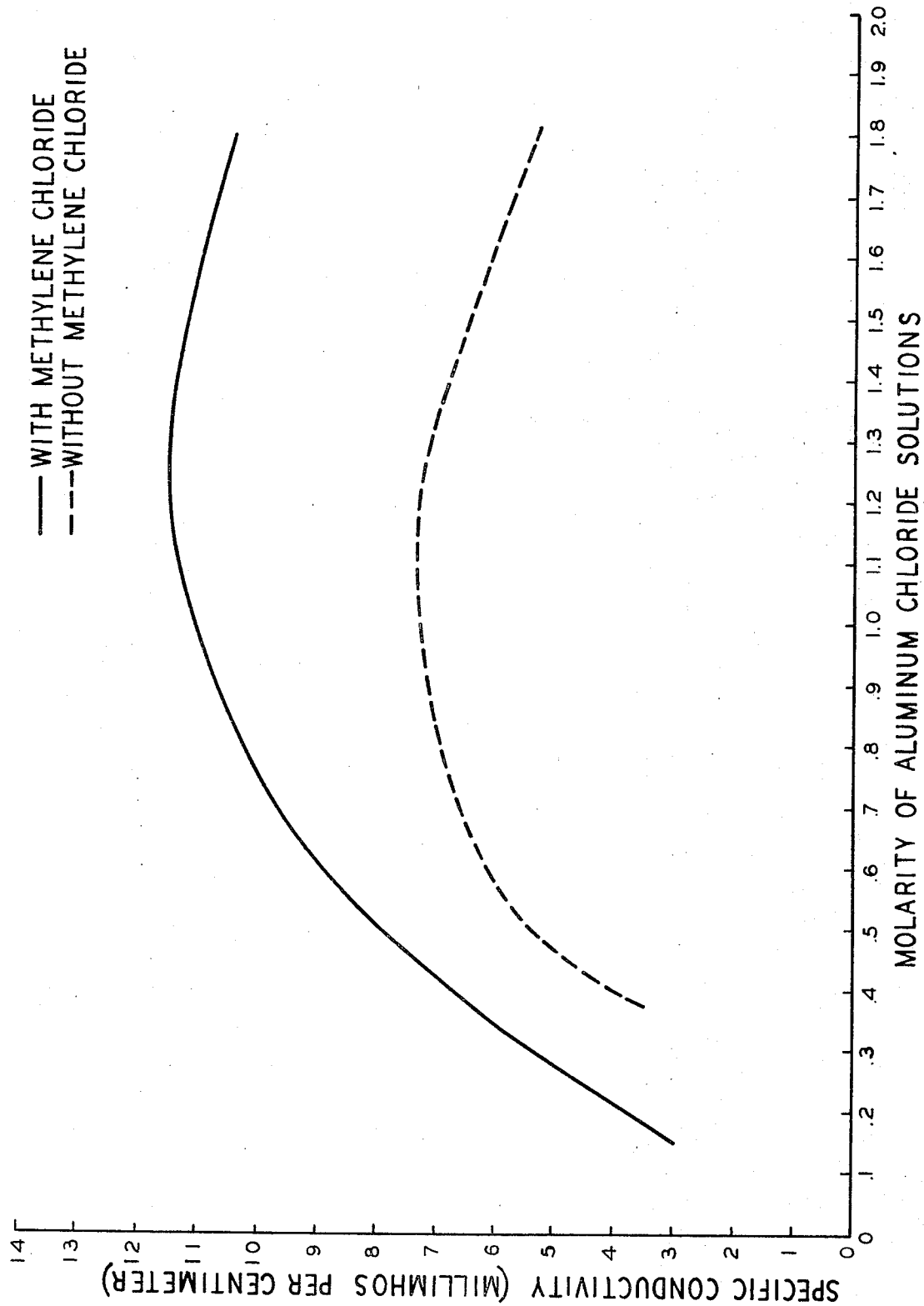

3,544,385
NON-AQUEOUS BATTERY WITH METHYLENE CHLORIDE IN THE ELECTROLYTE
Gerald H. Newman, Strongsville, Ohio, assignor to Union Carbide Corporation, New York, N.Y., a corporation of New York
Filed Nov. 4, 1968, Ser. No. 773,102
Int. Cl. H01m 11/00
U.S. Cl. 136—155                              7 Claims

ABSTRACT OF THE DISCLOSURE

The invention relates to a mixed solvent system for use in non-aqueous organic electrolytes. The novel electrolytes comprise a solute dissolved in a mixed solvent system, one of the solvent being methylene chloride.

---

This invention relates to battery electrolytes and more particularly to mixed solvent systems for non-aqueous organic electrolytes.

The development of high energy battery systems requires the compatibility of an electrolyte possessing desirable electrochemical properties with highly reactive anode materials, such as lithium, and the efficient use of high energy density cathode materials, such as nickel fluoride. The use of aqueous electrolytes is precluded in these systems since the anode materials are sufficiently active to decompose water chemically. It has therefore been necessary, in order to realize the high energy density obtainable through use of these highly reactive anodes and high energy density cathodes, to turn to the investigation of non-aqueous electrolyte systems and more particularly to non-aqueous organic electrolyte systems.

The term "non-aqueous organic electrolyte" as used herein refers to an electrolyte which is composed of a solute, such as a salt or complex salt of Group I-A, Group II-A or Group III-A elements of the Periodic Table, dissolved in an appropriate non-aqueous organic solvent, such as propylene carbonate, ethylene carbonate or γ-butyrolactone. The term "Periodic Table" as used herein refers to the Periodic Table of the Elements as set forth on the inside back cover of the Handbook of Chemistry and Physics, 48th edition. The Chemical Rubber Co., Cleveland, Ohio, 1967–1968.

A multitude of solutes are known and recommended for use but the selection of a suitable solvent has been particularly troublesome. The ideal battery electrolyte would comprise a solvent-solute pair which have a long liquid range, high ionic conductivity, and stability. A long liquid range, i.e., high boiling point and low freezing point, is essential if the battery is to operate at extreme temperatures. High ionic conductivity is necessary if the battery is to have high rate capability. Stability is necessary with both the electrode materials, the materials of construction, and the reaction product to provide long shelf life and reversible of reaction when used in a secondary battery system.

Most non-aqueous organic electrolytes have been deficient in one or more of these properties. This deficency has been particularly notable with regard to ionic conductivity since the very nature of the organic compound is one which severely restricts ionic conductivity.

The classical concept of the importance of high dielectric constant and low viscosity to produce a highly conductive ionic solution has applications to non-aqueous organic systems. The majority of the solvents presently known for this use possess either a low dielectric constant or are highly viscous thereby limiting the conductivity of an electrolyte incorporating these solvents. In an attempt to obtain a more conductive solution, mixed solvent systems have been proposed wherein a solvent with a low viscosity is mixed with a high dielectric constant viscous solvent in order to decrease the viscosity of the resulting solution. In cases where this was done, a somewhat higher conductivity was obtained. For a diluent to be effective in increasing conductivity, it has previously been accepted in the art that the diluent must combine low viscosity with a dielectric constant which is not appricabaly lower than that of the viscous solvent. It was thought that if the dielectric constant of the diluent were much lower than that of the solvent that any increase in conductivity obtained through a lowering in viscosity would largely be defeated by the adverse effect on the dielectric constant of the viscous solvent. For this reason, solvents having a dielectric constant below about 20 have usually not been considered for battery applications.

In addition to lower viscosity, a diluent must be sufficiently soluble in the selected solvent to allow a substantial decrease in the viscosity of the entire system. Many of the proposed diluents have been sufficiently soluble in the solvent materials themselves but, upon addition of solute, the solubility of the diluent is decreased to such an extent that the decrease in viscosity and resulting increase in conductivity of the entire electrolyte system is minimal.

It has now been unexpectedly discovered that the conductivity of non-aqueous electrolytes, and particularly non-aqueous organic electrolytes, can be substantially increased by the additional of methylene chloride as a diluent for the solvent.

The effect obtained using methylene chloride in organic electrolytes was completely unexpected since methylene chloride has a very low dielectric constant of the order of about 9 at a temperature of 20° C. Moreover, it has been found that many compounds closely related chemically to methylene chloride are only slightly miscible in the well known propylene carbonate-aluminum chloride electrolyte system. It has been found, for example, in the propylene carbonate-aluminum chloride electrolyte, that phase separation occurs upon the addition of many solvents including benzene, ethyl ether, carbon tetrachloride, chloroform, trichloroethylene, and closely related ethylene dichloride. Thus, one skilled in the art would expect methylene chloride to behave in a propylene carbonate-aluminum cholride system in a manner similar to the related chlorinated solvents, but it does not do so. It has now been discovered that, unexpectedly, methylene chloride is highly miscible with propylene carbonate in the presence of aluminum chloride.

The sole figure of the accompanying drawing is a curve plotting the specific conducivity of the propylene carbonate-aluminum chloride system with and without the addition of methylene chloride.

While applicant does not desire to be bound by any theory, it appears that the increase in conductivity upon the addition of methylene chloride to an electrolyte is the result of a physical change in the system rather than a chemical reaction. The methylene chloride does not react with propylene carbonate or any of the other well known solvents and does not form complexes with any of these solvents. Rather, it appears that the methylene chloride molecule, being small and spherical in shape, acts as a "lubricant" in the electrolyte system allowing uninterrupted ion migration through the electrolyte. Most compounds chemicaly similar to methylene chloride are larger in molecular size and would tend to interfere with ion migration.

Since the effect of methylene chloride upon the system is purely physical, this additive can be used effectively with any of the commonly employed electrolyte solute-solvent pairs, anodes, and cathodes.

The preferred anode materials include lithium, aluminum and the alkaline earth metals. Among these, lithium is the most preferred.

Preferred cathode materials include silver chloride, nickel fluoride, cupric fluoride, nickel chloride, cupric chloride, and silver fluoride. Of these, silver chloride is the most preferred.

As indicated above, any of the commonly used electrolyte solvents can be improved by the addition of methylene chloride. Typical solvents usually contain one of the following functional groups:

Class I solvents:

(Carbonyl)

Class II solvents:

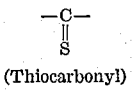

(Thiocarbonyl)

Class III solvents:

(Cyano)

Class IV solvents:

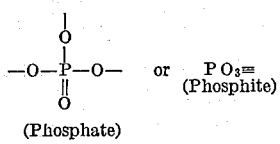

(Phosphate)      (Phosphite)

Class V solvents:

(Nitrogen)

More completely described:

Class I solvents (A) Ketones: Compounds having the structure

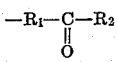

where $R_1$ or $R_2$ represent any of the alkyl or aryl groups (methyl, ethyl, propyl, butyl, amyl, phenyl, etc.).
Example:

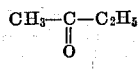

Methyl ethyl ketone (B) Esters: Compounds having the structure

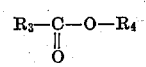

where $R_3$ and $R_4$ represent any of the alkyl groups.
Example:

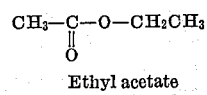

Ethyl acetate

R may also be replaced by H (hydrogen atom) to give

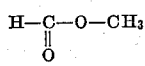

Included in this group are the cyclic esters such as the lactones.
Example:

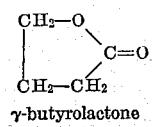

γ-butyrolactone (C) Carbonates: Compounds having the structure

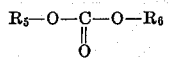

where $R_5$ and $R_6$ represent alkyl groups.
Example:

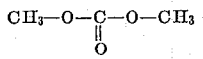

Dimethyl carbonate

Included in this group are the cyclic carbonates.
Example:

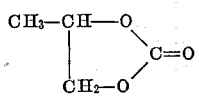

Propylene carbonate

Class II solvents (A) Sulfoxides (ketonic type): Compounds having the structure

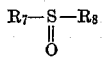

where $R_7$ and $R_8$ represent alkyl groups.
Example:

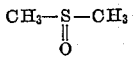

Dimethyl sulfoxide

This group also includes the cyclic oxides.
Example:

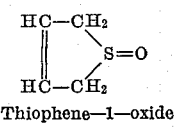

Thiophene-1-oxide (B) Sulfones (ketonic type): Compounds having the structure

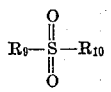

where $R_9$ and $R_{10}$ represent alkyl groups.
Example:

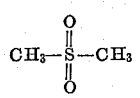

Dimethyl sulfone

This group also includes the cyclic structures.
Example:

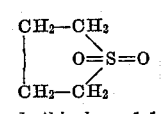

Tetrahydrothiophene, 1-1 dioxide (C) Sulfinic esters: Compounds having the structure

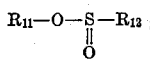

where $R_{11}$ and $R_{12}$ represent alkyl groups. This group includes the cyclic sulfinic esters.

(D) Sulfonic esters: Compounds having the structure

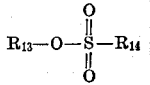

where $R_{13}$ and $R_{14}$ are alkyl.

(E) Sulfites: Compounds having the structure

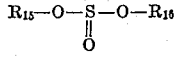

where $R_{15}$ and $R_{16}$ are alkyl.

(F) Sulfates: Compounds having the structure

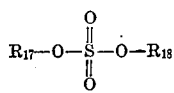

where $R_{17}$ and $R_{18}$ are alkyl.

Class III solvents

Compounds having the structure $$R_{19}-C\equiv N$$

where $R_{19}$ is alkyl.
Example:

$$CH_3-C\equiv N$$

(Acetonitrile)

Class IV solvents (A) Phosphates: Compounds having the structure

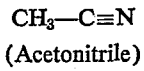

where $R_{20}$, $R_{21}$ and $R_{22}$ are alkyl, aryl or hydrogen.
Example:

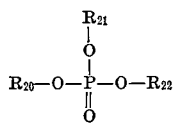

Trimethyl phosphate (B) Mono- and di-phosphites: Compounds having the structure

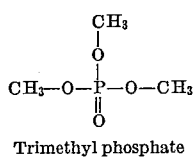

where $R_{23}$ and $R_{24}$ are alkyl, aryl or hydrogen.
Example:

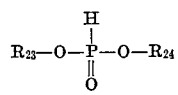

Diethylphosphite (C) Tri-phosphites: Compounds having the structure

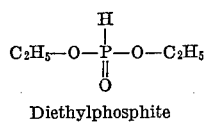

where $R_{25}$, $R_{26}$ and $R_{27}$ are alkyl, aryl or hydrogen.
Example:

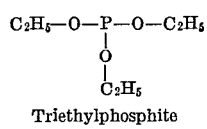

Triethylphosphite

Class V solvents (A) Amines: Compounds having the structure

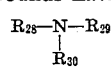

where $R_{28}$, $R_{29}$ and $R_{30}$ represent hydrogen, or any of the alkyl or aryl groups.
Example:

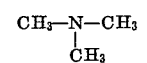

Trimethyl amine (B) Amides: Compounds having the structure

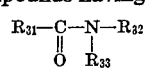

where $R_{31}$, $R_{32}$, and $R_{33}$ are hydrogen, alkyl or aryl.

Example:

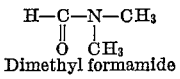

Dimethyl formamide (C) Nitro compounds: Compounds having the structure

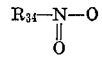

where $R_{34}$ is alkyl or aryl.
Example:

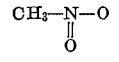

Nitromethane

Examples of the most preferred solvents are ethylene carbonate, propylene carbonate, butylene carbonate, cyclic esters such as γ-butyrolactone and valerolactone, dimethylformamide, propylene glycol sulfite and nitromethane.

As has previously been described, the electrolyte comprises a solute dissolved in a solvent. A very large number of solutes are successfully employed in the above solvent systems and these solutes typically comprise salts, including complex salts, of Group I–A, Group II–A, and Group III–A elements of the Periodic Table. Preferred solutes include potassium thiocyanate, potassium hexafluorophosphate, aluminum chloride, lithium chloride, calcium chloride, magnesium perchlorate, lithium perchlorate, lithium bromide, lithium aluminum tetrachloride and lithium hexafluoroarsenate. Of these aluminum chloride is most preferred.

Since methylene chloride does not react chemically with the electrolyte system, there is no stoichiometric amount which can be calculated to guide one in determining the correct quantity of methylene chloride to be added to a particular electrolyte system. In addition, since methylene chloride is highly miscible in solute-solvent systems, solubility does not act as a limiting property in using this diluent. For this reason, the quantity of methylene chloride to be added to obtain the greatest increase in conductivity can be determined simply by measuring the increase in conductivity upon addition of various amounts of diluent. This is also true with regard to the amount of the solute present in the electrolyte since, as is well recognized in the art, the conductivity will vary substantially depending upon the quantity of solute present in the system. In the aluminum chloride-propylene carbonate system, aluminum chloride concentrations of from 0.1 to 3.2 molar (based on propylene carbonate) were examined and all yielded substantial increases in conductivity upon addition of methylene chloride in volume ratios of methylene chloride-to-propylene carbonate of 2:1, 1:1 and 1:2. Maximum conductivity, ignoring the effect of methylene chloride, is obtained at a mole ratio of aluminum chloride-to-propylene carbonate of 0.26:1 and dilution with methylene chloride causes an increase in conductivity with a maximum occurring at about a volume ratio of 1:1 of propylene carbonate-to-methylene chloride.

The following examples will further illustrate preferred systems, concentrations, and increases in conductivity obtained in accordance with the teaching of the present invention.

EXAMPLE 1

Several test solutions were prepared containing varying molarities of aluminum chloride in propylene carbonate and to these solutions were added methylene chloride in ratios of 1:1 by volume based upon the propylene carbonate present. These solutions were placed in a conductivity cell and specific conductivity was measured with a standard Wayne-Kerr conductivity bridge at a temperature of 25° C. The results are plotted in the attached drawing. In addition, the drawing contains a plot of specific conductivities given in the literature for the propylene carbonate-aluminum chloride system in the absence of methylene chloride. As is readily apparent, the addition of methylene chloride causes a substantial increase in specific conductivity within the system. The increase obtained, in certain concentrations, was of the order of 60%.

EXAMPLE 2

Several test cells were prepared with lithium metal anodes having a surface area of 6 square centimeters, silver chloride cathodes having a surface area of 6 square centimeters, and about 2–3 milliliters of electrolyte absorbed in a separator between the anode and cathode. These components were placed in polytetrafluoroethylene holders and clamped together.

In several of these cells the electrolyte was a 1:1 by volume mixture of methylene chloride and propylene carbonate containing 20.05 grams of aluminum chloride per 100 milliliters of the mixture. These cells showed virtually no polarization of the lithium anode on an initial 2 milliampere per square centimeter current drain. After 1½ hours, the anode had polarized only about 200 millivolts. At a 3.3 milliampere per square centimeter drain, the cells exhibited anode polarization of only about 275 millivolts after a period of 2 hours.

Control cells were prepared in which the electrolyte was 0.75 molar aluminum chloride in propylene carbonate (about 10 grams per 100 milliliters). These cells would not operate at current densities above about 0.57 milliampere per square centimeter without severe polarization of the order of 1.0 volt or greater. Even at this low current drain, polarization amounted to about 125 millivolts after 2 hours.

The above comparison demonstrates the substantial beneficial effect obtained in this cell system upon the addition of methylene chloride, particularly in terms of lower anode polarization.

EXAMPLE 3

A test solution of 0.944 molar lithium perchlorate in propylene carbonate was prepared. This solution had a specific conductivity of about 3.6 millimhos per centimeter.

To 100 milliliters of this solution were added 10 milliliters of methylene chloride. The specific conductivity of the resulting solution was about 4.2 millimhos per centimeter. The addition of another 15 milliliters raised the conductivity to about 4.7 millimhos per centimeter and the conductivity continued to rise upon addition of methylene chloride until a peak was reached at almost 5 millimhos per centimeter after an addition of a total of 45 milliliters of methylene chloride to the system.

While the present invention has been described with reference to many partciular details thereof, it is not intended that these details shall be construed as limiting the scope of this invention.

What is claimed is:

1. A non-aqueous battery system comprising an anode and cathode at different potentials and an electrolyte having a solute dissolved in a mixed organic solvent system, one of the solvents being methylene chloride.

2. The non-aqueous battery system of claim 1 wherein the methylene chloride is present as a diluent for a non-aqueous organic solvent.

3. The non-aqueous battery system of claim 1 wherein the electrolyte is a solution of aluminum chloride in propylene carbonate and methylene chloride.

4. The non-aqueous battery system of claim 1 wherein the electrolyte is a solution of lithium perchlorate in propylene carbonate and methylene chloride.

5. The non-aqueous battery system of claim 1 wherein the mixed solvent system is a 1:1 by volume mixture of propylene carbonate and methylene chloride.

6. The non-aqueous battery system of claim 1 wherein the anode is lithium, the cathode is silver chloride, and the electrolyte is a solution of aluminum chloride in a mixed solvent containing propylene carbonate and methylene chloride.

7. The non-aqueous battery system of claim 1 wherein the anode is lithium, the cathode is nickel fluoride, and the electrolyte is a solution of lithium perchlorate in a mixed solvent containing propylene carbonate and methylene chloride.

References Cited

UNITED STATES PATENTS 3,393,093   7/1968   Shaw et al. _____ 136—155 XR
3,468,716   9/1969   Eisenberg _____ 136—154 XR WINSTON A. DOUGLAS, Primary Examiner D. L. WALTON, Assistant Examiner